United States Patent [19]

Fournier, Jr. et al.

[11] Patent Number: 4,968,123
[45] Date of Patent: Nov. 6, 1990

[54] HELMET MOUNTED DISPLAY CONFIGURED FOR SIMULATOR USE

[75] Inventors: Joseph T. Fournier, Jr., Glastonbury; Stephen J. Smith, Simsbury, both of Conn.; Harry R. McKinley, Southampton, Mass.

[73] Assignee: United Technologies Corporation, Hartford, Conn.

[21] Appl. No.: 342,497

[22] Filed: Apr. 24, 1989

[51] Int. Cl.$^5$ .................. G02B 23/00; G02B 27/14
[52] U.S. Cl. ................................. 350/538; 350/174; 350/145
[58] Field of Search ............... 350/171, 174, 538, 545, 350/569, 145; 340/705; 250/330

[56] References Cited

U.S. PATENT DOCUMENTS

| | | | |
|---|---|---|---|
| Re. 27,356 | 2/1966 | LaRussa | 350/157 |
| 3,059,519 | 10/1962 | Stanton | 88/1 |
| 3,614,314 | 10/1971 | Rossier | 178/7.88 |
| 3,870,405 | 3/1975 | Hedges | 350/294 |
| 3,923,370 | 12/1975 | Mostrom | 350/55 |
| 4,028,725 | 6/1977 | Lewis | 358/103 |
| 4,153,913 | 5/1979 | Swift | 358/93 |
| 4,218,111 | 8/1980 | Withrington et al. | 350/3.72 |
| 4,225,215 | 9/1989 | Cojan | 350/174 |
| 4,508,424 | 4/1985 | Ruder | 350/174 |
| 4,660,943 | 4/1987 | Ellis | 350/538 |
| 4,669,810 | 6/1987 | Wood | 350/3.7 |
| 4,755,664 | 7/1988 | Holmes et al. | 250/213 |
| 4,761,056 | 8/1988 | Evans et al. | 350/174 |
| 4,763,990 | 8/1988 | Wood | 350/320 |
| 4,775,217 | 10/1988 | Ellis | 350/538 |

OTHER PUBLICATIONS

Martin Shenker, *Optical Design Criteria for Binocular Helmut-Mounted Displays* SPIE vol. 778 Display System Optics (1987), pp. 70–77.
E. Lewis and B. Amos, *A High Resolution Vision System for Aircraft and Trainers*, NAECON'76 Record, pp. 894–902.
Richard A. Buchroeder, *Helmut-Mounted Displays*, SPIE's 1987 Technical Symposium Southeast on Optics, Electro-Optics, and Senor, May 21, 1987.

*Primary Examiner*—Bruce Y. Arnold
*Assistant Examiner*—Ronald M. Kachmarik
*Attorney, Agent, or Firm*—Richard H. Kosakowski

[57] ABSTRACT

Helmut mounted display apparatus configured for simulator use includes a pair of visual image sources and a pair of optics arrangements, including relay optic and eyepiece portions thereof, that optically present the image source images into the wearer's forward visual field, a first eyepiece type optimized for daytime luminance conditions, a second type optimized for nighttime luminance conditions, a single eyepiece being releasably engageable to and rotatable about the corresponding relay optic portion, wheeby said eyepiece rotation allows a varying binocular field of view to be displayed to the wearer.

35 Claims, 9 Drawing Sheets

HELMET MOUNTED DISPLAY CONFIGURED FOR SIMULATOR USE

This invention was made with Government support under a contract awarded by the Department of the Army. The Government has certain rights in this invention.

DESCRIPTION

1. Technical Field

This invention relates to helmet mounted displays, and more particularly to a helmet mounted display configured for simulator use.

2. Background Art

Helmet mounted displays (HMDs) are used in aircraft and rotorcraft to aid a pilot in visually interpreting data In the HMD art, computer generated flight data is fed to a CRT image source, whose image is projected optically into the pilot's forward visual field of view (FOV) The HMD thus allows the pilot to spend more time piloting the craft in a head-up mode, i e., looking out at the exterior scene and not looking down as often at the instrument panel.

Since HMDs are relatively new, HMD visual requirements are not fully defined (e g., optimum combinations of FOV, resolution, and FOV overlap). FOV can be increased by splitting the binocular image into left and right monocular image portions, together with an overlap portion seen by both eyes. Since the size and complexity of the optics increase with the size of the monocular FOV, an advantage of the partial overlap approach is a large total binocular FOV with smaller, less complex optics.

However, partial overlap imaging systems may pose problems such as retinal rivalry wherein left and right images are alternately perceived Also, since each eye views a different image, image suppression can occur wherein only one dominant image is perceived. Associated problems include eyestrain, headaches, and fatigue from the observer's effort to fuse misaligned images. Also, since the CRT image sources typically have limited resolution, the larger the desired FOV, the less the resolution. Some of these problems relate to image alignment in the overlap region; some relate to the amount of partial overlap. Thus, a need exists for a HMD which permits the investigation of various combinations of FOV, FOV overlap, and resolution in order to evaluate observer performance and determine optimum partial overlap configurations.

DISCLOSURE OF INVENTION

Objects of the invention include providing a partial overlap HMD having binocular optic means and optical and mechanical means for varying the degree of partial overlap of the left and right visual fields. Further objects include providing an HMD with interchangeable catadioptric and refractive eyepieces, and providing the HMD with coupled external viewing optics.

According to one aspect of the invention, helmet mounted apparatus includes an image source and an independent optical arrangement for each eye, each arrangement having day/night relay optics disposed along the image source optical axis, and having a rotatable eyepiece, said eyepiece being releasably engageable from the relay optics to permit use of different eyepiece embodiments for daytime and nighttime light conditions, the relay optics presenting the source image along the optical path to the engaged eyepiece into the observer's forward visual field, whereby the rotation of the eyepiece varies the amount of overlap of the left and right eye images presented in the observer's forward visual field.

According to a second aspect of the present invention, a viewing objective lens and refractive means are releasably engaged to the day/night relay optics by means of a rotatable coupling, the objective lens disposed on the helmet to view the external scene forward of the observer, the refractive means disposed to couple the external scene image on the objective lens into the optical path of the relay optics, the relay optics presenting both the image source image and the external scene image to the engaged nighttime embodiment eyepiece into the observer's forward visual field.

The present invention allows the observer to rotate the eyepiece about a vertical axis through the center of each eyepiece, thereby presenting different fields of view to each eye. This varies the total binocular FOV with respect to total horizontal FOV and binocular overlap. With no eyepiece rotation, both images are entirely overlapped; thus, the total binocular FOV is at its smallest value. With eyepiece rotation, the left eye is presented with a portion of the image from the left eye image source, the right eye is presented with a portion of the image from the right eye image source, and portions of each image overlap, the overlap portion being seen by both eyes. If the rotation is at its extreme value, then zero overlap exists.

These and other objects, features and advantages of the present invention will become more apparent in the light of the detailed description of a best mode embodiment thereof, as illustrated in the accompanying drawing.

BEST MODE FOR CARRYING OUT THE INVENTION

Figure 1:
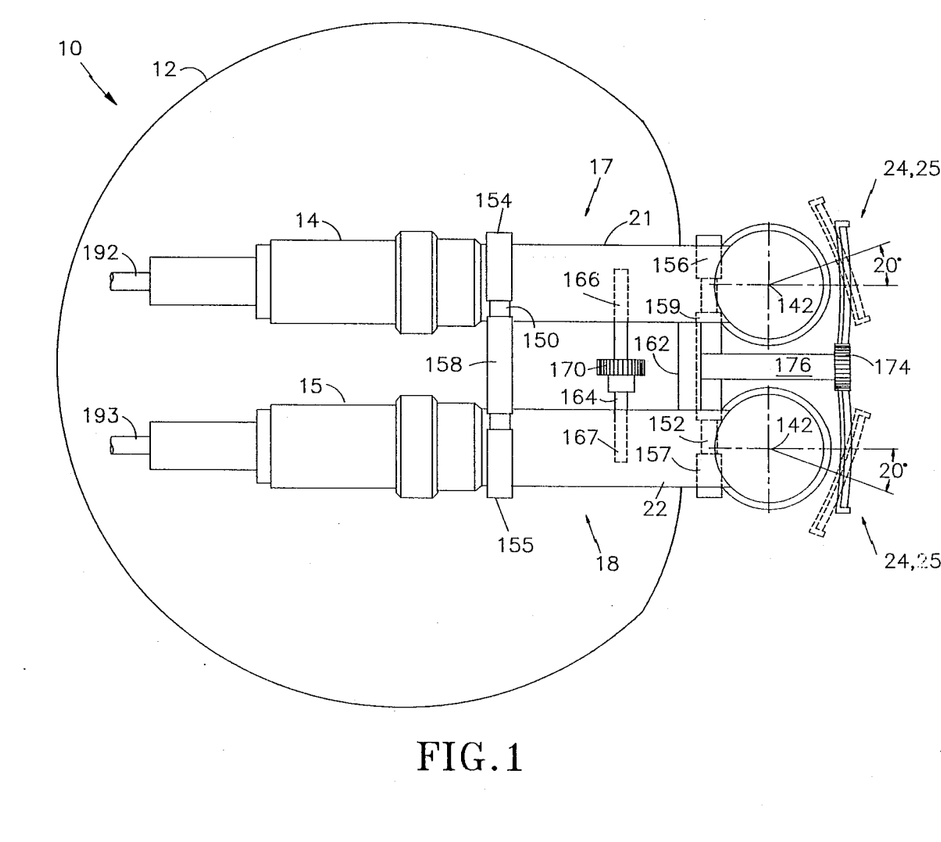
FIG. 1 is a top view of HMD simulator apparatus in accordance with the present invention.
Figure 2:
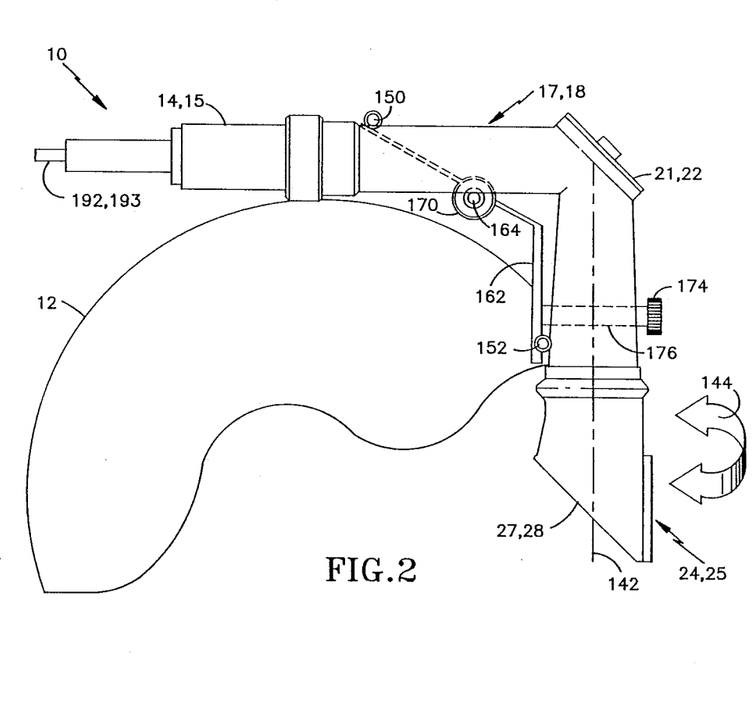
FIG. 2 is a side view of the HMD simulator apparatus of FIG. 1.
Figure 3:
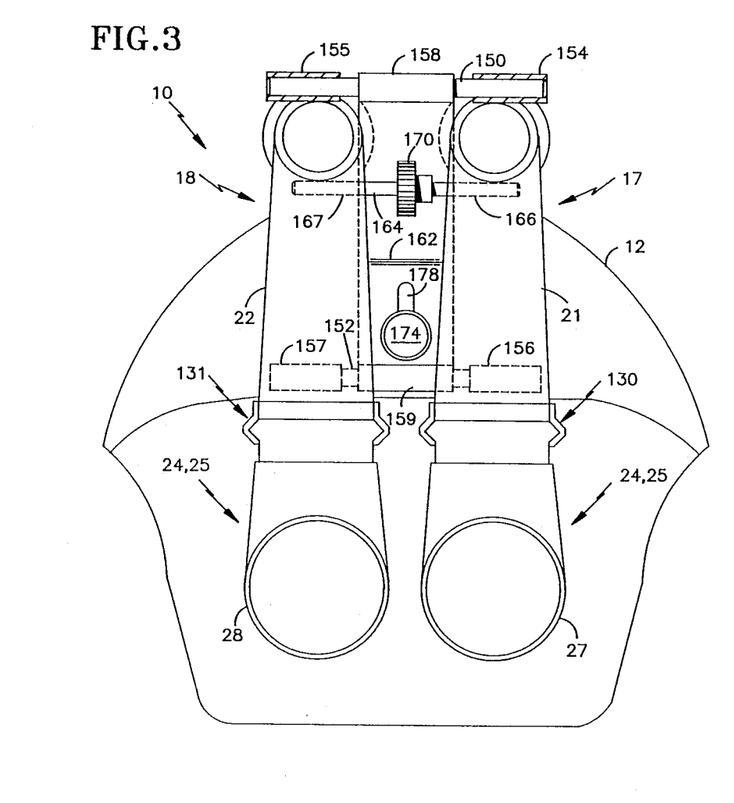
FIG. 3 is a front view of the HMD simulator apparatus of FIG. 1.

FIGS. 1–3 illustrate top, side, and front views, respectively, of HMD simulator apparatus 10 in accordance with the present invention. The HMD 10 mounts to an outer surface of a known type aviator's helmet 12, e.g., Model HGU55 from Gentex Corp. of California. The helmet outer surface provides an opening in proximity to the facial area of an observer wearing the helmet 12.

The HMD comprises two CRT image sources 14,15, each with an identical, independent, modular optics arrangement 17,18 for each eye. Each arrangement 17,18 comprises an aluminum or suitable plastic or composite material housing 21,22 enclosing relay optics (not visible) common to both day and night luminance conditions. Each arrangement also comprises an interchangeable, rotatable day eyepiece 24 and an interchangeable, rotatable night eyepiece 25. The eyepieces shown in FIGS. 1-3 are illustrative of either the day or night eyepiece. Each eyepiece 24,25 comprises an aluminum or suitable plastic (e.g., Delrin, ABS, Ryton, Torlon) or composite material housing 27,28 enclosing optical components (not visible), with different embodiments for day or night light conditions. Either the day or night eyepiece is engaged to the relay optics at one time. Further HMD features illustrated in FIGS. 1-3 are described hereinafter.

Figure 4:
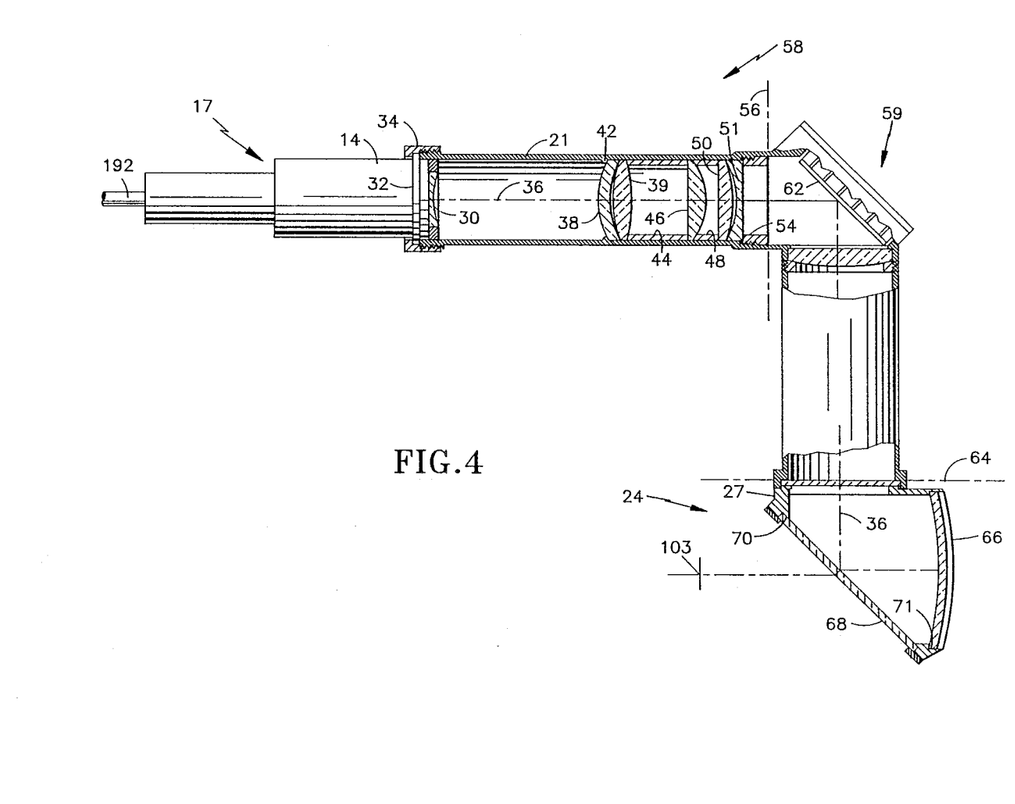
FIG. 4 is a partial cross section of one optical arrangement used in the HMD apparatus of FIG. 1.

FIG. 4 is a cross-section view of one of two identical arrangements 17,18 (e.g., the left eye arrangement 17). The image source 14 is typically a one inch diameter, miniature CRT, e.g., Model H-1380 from Hughes Aircraft Company, Industrial Products Division, Carlsbad, Calif. The CRT presents a visual image on a fiber optic faceplate 30, and attaches to the relay optics housing 21 by a flange 32 glued to the CRT and a threaded nut assembly 34. Proceeding along an optical axis 36, a pair of glass lenses 38,39 follow the faceplate 30. The first lens 38 is positioned with a machined seat 42 while the second lens 39 rests against the first lens 38. A first tubular spacer 44 follows the second lens 39, followed by a third lens 46, a second tubular spacer 48, and a second pair of lenses 50,51. A retaining nut 54 holds the lenses 38,39,46,50,51 and spacers 44,48 in place. The lens pair lenses 38,39,50,51 comprise different types of glass (e.g., F4 and silicon dioxide (SIO2)) so as to reduce chromatic abberrations.

A first split line 56 designates a physical break in the relay optics housing 21; a first part 58 following the CRT 14 is either press-fitted or glued into a second part 59 disposed along the image source optical axis 36 following the first part 58. A fold mirror 62 is used to direct the optical image rays downward into the second part 59 of the relay optics housing 21. The fold mirror 62 attaches to the relay optics housing using well known, low stress optical component mounting techniques. The relay optics housing 21 ends at a second split line 64, below which is the eyepiece housing 27.

Figure 6:
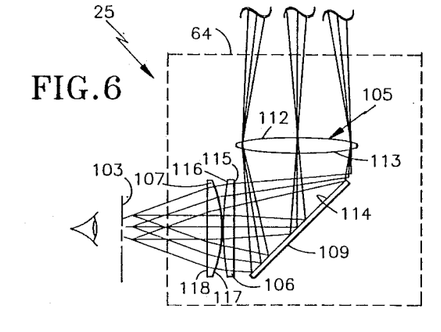
FIG. 6 is an optical ray trace of an alternate embodiment of one portion of the optical arrangement of FIG. 4.

For daytime use the eyepiece 24 is catadioptric and employs a partially transmissive, partially reflective combiner 66 and beamsplitter 68 optical components. All eyepiece components (both for the day and night eyepieces) are held in place in machined seats 70,71 (the night eyepiece components are illustrated in FIG. 6).

Figure 5:
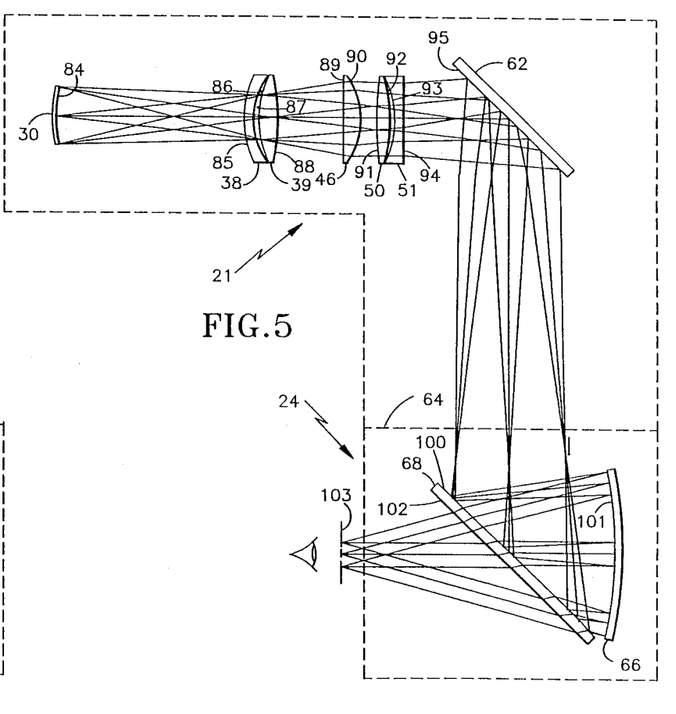
FIG. 5 is an optical ray trace of an embodiment of optical components as may be used in the arrangement of FIG. 4.

FIG. 5 illustrates an optical ray trace of one of the identical arrangements 17,18, including the relay optics 21 and day eyepiece 24.

TABLE I

| Surface No. | Radius (mm) | Curve Type | Thick/Dist (mm) | Mat'l |
|---|---|---|---|---|
| 84 | 40.000000 | CV | 62.600000 | AIR |

TABLE I-continued

| Surface No. | Radius (mm) | Curve Type | Thick/Dist (mm) | Mat'l |
|---|---|---|---|---|
| 85 | 28.285000 | CX | 3.000000 | F4 |
| 86 | 20.309000 | CV | 2.731300 | AIR |
| 87 | 52.397000 | CX | 5.500000 | SIO2 |
| 88 | 81.200000 | CX | 22.462960 | AIR |
| 89 | 201.985000 | CV | 5.500000 | SIO2 |
| 90 | 24.617000 | CX | 5.342720 | AIR |
| 91 | 1253.000000 | CX | 4.500000 | SIO2 |
| 92 | 46.488000 | CX | 1.147060 | AIR |
| 93 | 30.500000 | CV | 3.000000 | F4 |
| 94 | 98.331000 | CX | 34.300000 | AIR |
| 95 | — | — | 144.000000 | AIR |
| 100 | — | — | 33.947919 | AIR |
| 101 | 137.360000 | CV | 35.087919 | AIR |
| 100 | — | — | 3.000000 | ACRYL |
| 102 | — | — | 51.420000 | AIR |
| 103 | — | — | — | — |

Table I lists the prescription data for the components in FIG. 5. Listed in order from left to right are the surface number, the radius of curvature in millimeters (mm), the type of curvature (CV = concave; CX = convex), the distance to the next surface, or thickness, in mm, and the type of material between the surface and the next surface.

Referring to FIG. 5 and Table I, the CRT image faceplate 30 has a surface 84 of 40 mm radius. The image rays travel through air a distance of 62.6 mm to a first surface 85 of the first glass lens 38. All distances listed in Table I are measured from the component centers. The first surface 85 of the first lens 38 is convex with a radius of 28.285 mm, a 3.0 mm thickness, and comprises F4 glass. The remaining components are determined from FIG. 5 and Table I in a similar manner.

A surface 95 of the fold mirror 62 comprises an aluminized reflective coating A surface 100 of the beamsplitter 68 is listed twice in Table I because it reflects the image rays to mirror surface 101 (a distance of 34.801353 mm), which reflects the rays back to and through the beamsplitter 68, whose thickness is 3 mm. Surface 103 is that of the image exit pupil, approximately 8 mm in diameter.

Referring also to FIG. 4 again, the relay optics forms an intermediate focused image of the image of the CRT at a focal plane which is at a distance of approximately 215 mm along the optical axis 36 from the faceplate 30. However, the useful range of the intermediate image focal plane can range up to 400 mm; thus, the location of the intermediate image focal plane may be approximated by the location of the second split line 64. The focused image at the intermediate image focal plane is at a magnification of 2.0 times the image of the CRT. However, the useful range of the magnification can range from 0.5-4.0.

The day eyepiece 24 presents a virtual image of the CRT in the observer's forward visual FOV. The virtual image is focused at a distance of from one meter to infinity from the observer's eye. The day eyepiece components are designed for approximately 36% see-through light transmission from the external scene disposed beyond the eyepiece. Thus, the virtual image is superposed on the observer's view of the external scene. The virtual image occupies a portion of the observer's visual field having a minimum subtense at the eye of 10 degrees.

The active image area of the miniature CRT 14,15 is 19 mm in diameter. The diameters of the relay optics lenses 38,39,46,50,51 are chosen to contain the rays therein. The relay optics lenses are all glass; either F4 or SIO2, while the eyepiece components 66,68 are all acrylic plastic. Plastic was chosen for weight and safety reasons. However, it is to be understood that the eyepiece components can be glass without detracting from the scope of the present invention.

All components other than the fold mirror 62 have a known antireflective coating. The coatings on the combiner surface 101 and beamsplitter surface 100 are adjusted for a partial reflectivity of 20%-60% of visible light in the wavelength range of 400-700 nanometers. Also, the type and radius of curvatures of all components are chosen in part to control astigmatism and spherical aberrations. Each component in FIG. 5 can be built from the Table I data using known techniques.

FIG. 6 illustrates an optical ray trace of the night eyepiece 25 for use with the relay optics 21 of FIG. 4; the ray trace of the relay optics is the same as in FIG. 5. Table II lists the corresponding prescription data for the relay optics and night eyepiece. The refractive night eyepiece includes lenses 105, 106,107 and a mirror 109. Mirror surface 114 is an opaque, aluminized surface which totally reflects the CRT image rays into the observer's forward visual field, and also blocks transmission of the external scene into the observer's visual field. The image presented to the observer's forward visual field occupies an angle with a minimum subtense at the eye of 20 degrees.

TABLE II

| Surface No. | Radius (mm) | Curve Type | Thick/Dist (mm) | Mat'l |
|---|---|---|---|---|
| 84 | 40.000000 | CV | 62.600000 | AIR |
| 85 | 28.285000 | CX | 3.000000 | F4 |
| 86 | 20.309000 | CV | 2.731300 | AIR |
| 87 | 52.397000 | CX | 5.500000 | SIO2 |
| 88 | 81.200000 | CX | 22.462960 | AIR |
| 89 | 201.985000 | CV | 5.500000 | SIO2 |
| 90 | 24.617000 | CX | 5.342720 | AIR |
| 91 | 1253.000000 | CX | 4.500000 | SIO2 |
| 92 | 46.488000 | CX | 1.147060 | AIR |
| 93 | 30.500000 | CV | 3.000000 | F4 |
| 94 | 98.331000 | CX | 34.300000 | AIR |
| 95 | — | — | 112.929245 | AIR |
| 112 | 58.105000 | CX | 7.000000 | ACRYL |
| 113 | 89.283000 | CX | 25.070755 | AIR |
| 114 | — | — | 20.500000 | AIR |
| 115 | — | — | 4.000000 | ACRYL |
| 116 | 83.478000 | CX | 0.500000 | AIR |
| 117 | 39.515000 | CX | 4.500000 | ACRYL |
| 118 | — | — | 25.000000 | AIR |
| 103 | — | — | — | — |

Referring again to FIGS. 1-3, the optical component arrangements 17,18 are each located in a vertical plane through an eye of the observer. This vertical orientation facilitates the presentation of the partial overlap image to the eyes, upon rotation of the eyepieces. However, an alternative arrangement may be used if mechanized to allow outward image rotation of the eyepiece optic axes relative to the downward line of sight.

Figure 7:
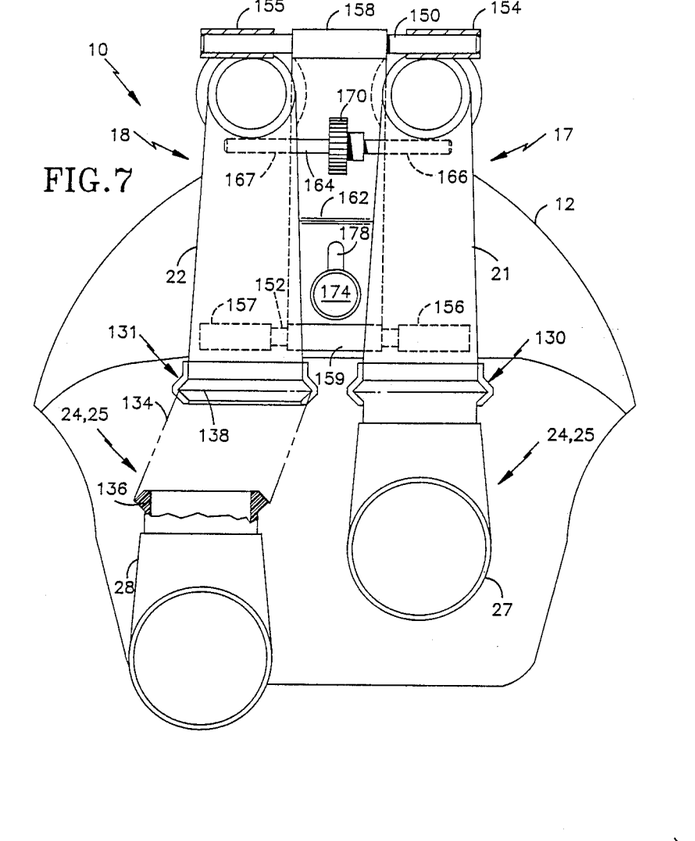
FIG. 7 is a second front view of the HMD simulator apparatus of FIG. 1, but with an eyepiece disengaged.

Each eyepiece housing 27,28 engages the corresponding relay optics housing 21,22 by releasable, rotatable coupling means 130,131. Referring also to FIG. 7, there is illustrated a front view of the HMD simulator apparatus 10 with the right eyepiece housing 28 disengaged from the relay optics housing 22 (as illustrated by dashed lines 134). A grooved portion 136 of the eyepiece housing 28 slides into a grooved portion 138 of the relay optics housing 22 from the front of the helmet 12. This allows the observer to readily change the eyepieces 24,25. The grooved portions 136,138 of the eyepiece and relay optics housings 28,22 also allow eyepiece rotation when engaged.

The HMD simulator of the present invention allows for manual rotation of each eyepiece independently, about an axis 142 through the second part 59 (ref. FIG. 4 also) of the relay optics housing 21,22 and through the center of the eyepiece housing 27,28 (as illustrated in FIG. 1 and by the rotational arrowheads 144 in FIG. 2). However, rotating an eyepiece through an angle about this vertical axis 142 causes the image to rotate through an equal angle. Thus, the observer must compensate by derotating the image source image by physical rotation of the CRTs, or by electronic rotation of the CRT image by the CRT drive electronics. Methods of electronic rotation of images are well-known, as illustrated by U.S. Pat. Nos. 3,959,582 and 3,641,260.

The rotation allows the day eyepiece FOV to range from 31 degrees (100% overlap of the left and right images at 0 degrees rotation) to 31 vertical degrees ×62 horizontal degrees (0% overlap with each eyepiece rotated outward by 15.5 degrees). Rotation of the night eyepiece allows the FOV to increase from 40 degrees (100% overlap) to 40×80 degrees (0% overlap with each eyepiece rotated outward by 20 degrees).

The relay optics housings 21,22 connect together by a first slidable rod 150 on the crown of the helmet 12, and by a second slidable rod 152 on the front of the helmet. The rods 150,152 slide within housings 154,155,156,157 attached to each relay optics housing, and also within housings 158,159 attached to a mounting bracket 162. The rods slide in response to a threaded thumbscrew adjustable rod 164. Female threaded housings 166,167 attach to each relay optics housing. The thumbscrew rod 164 mates with the threaded housings 166,167, and a thumbscrew 170 on the front of the helmet facilitates the adjustment. The thumbscrew rod adjusts the interpupillary distance (IPD) between the optical arrangements 17,18. The HMD 10 allows for an IPD adjustment range of 58.9-73.3 mm, which is suitable for a wide range of observer head sizes.

The IPD adjustment is also necessary because, when an eyepiece is rotated, the eyepiece exit pupil no longer aligns with the observer's line of sight. Thus, the optical axis in the eyepiece must be translated to align the exit pupil with the observer's line of sight.

A second thumbscrew 174 adjusts the vertical positioning of the optical component arrangements 17,18. The second thumbscrew 174 is part of a threaded rod 176 which threads into the front portion of the helmet 12. The threaded rod passes through a slot 178 in the front mounting bracket 162. When the second thumbscrew is loosened, the mounting bracket, and thus the optical arrangements, can be moved vertically with respect to the helmet. This allows for adjustment over a wide range of observer head sizes.

Figure 8:
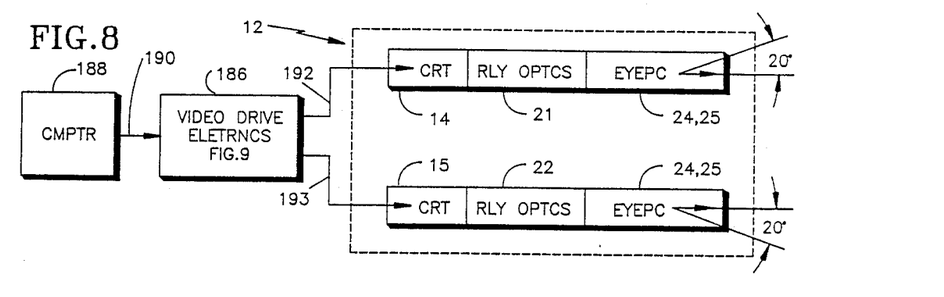
FIG. 8 is a functional block diagram of the HMD simulator apparatus of FIG. 1 together with associated support components.

The HMD simulator 10 of the present invention is intended for laboratory research use. FIG. 8 illustrates a block diagram of the HMD together with associated lab components. The components include video drive electronics 186 for control of the CRTs 14,15, and a computer 188 or other known, suitable device for generating both electronic image data and video drive electronics control signals. The video drive electronics 186 are of a known type and are not a part of the present invention. Any suitable circuitry for controlling a CRT may be used. Similarly, as an alternative to having the computer 188 generate the image data, a pair of video cameras (not shown) may be used for scanning a simulated scenic image.

For use with the catadioptric (day) eyepiece 24, the computer generates symbol image data, which includes typical flight data related to pilotage (e.g., weapon aiming or targetry data). For use with the refractive (night) eyepiece 25, and the computer either generates image data of a simulated scene superposed with symbol data, or the simulated scene data itself. The computer 188 feeds the signal information on signal lines 190 to the drive electronics 186 using, e.g., the RS-343 or RS-170 video data transmission protocols. The drive electronics connect to each CRT 14,15 by shielded cables 192,193.

Figure 9:
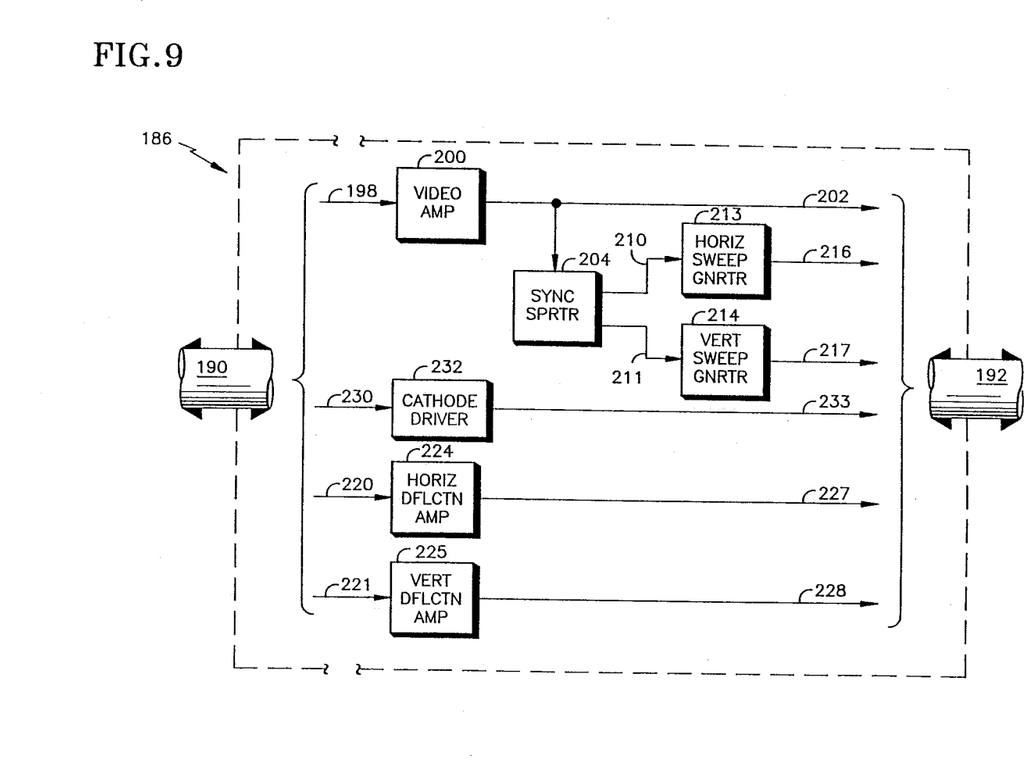
FIG. 9 is a block diagram of video drive electronics as used in FIG. 8.

The video drive electronics 186 operate the CRT in either the stroke (symbol) mode or the raster (scenic image) mode. FIG. 9 is a functional block diagram of the drive electronics for a single CRT. For raster operation, the CRT electron beam writes information in a line by line scanning sequence. The computer generated signals on the lines 190 include both synchronization signals for the CRT deflection circuitry and CRT beam intensity signals. In stroke mode, the CRT electron beam writes the information on the CRT screen by proper positioning of the horizontal and vertical deflection signals, while keeping the electron beam intensity constant. The signals on the lines 192 to the CRT include beam deflection and blanking signals.

For simultaneous CRT generation of an image containing scenery plus superimposed symbol data, the drive electronics operate the CRT simultaneously in stroke and raster modes. After the electron beam completes one field in raster mode, the electron beam enters the stroke mode and writes the symbol data on the screen. The beam then retraces vertically and begins raster scanning again.

In raster operation, the computer signals are fed on a line 198 to a video amplifier 200. The amplified signal output on a line 202 is fed to a sync separator 204 and also on the lines 192 to the CRT. The sync separator 204 removes the horizontal and vertical timing signal content and feeds the resulting horizontal and vertical sync signals on signal lines 210,211, respectively, to horizontal and vertical sweep generators 213,214. The sweep signal outputs are fed on lines 216,217 to the CRT to control the scanning sequence. The video amplifier output signal on the line 202 controls the intensity of the electron beam.

For stroke mode operation, the computer generated signal information on the lines 190 includes horizontal and vertical deflection signals, and electron beam blanking signals The deflection signals on lines 220,221 are fed to horizontal and vertical deflection amplifiers 224,225, whose outputs on lines 227,228 are fed on the lines 192 to the CRT. The deflection signals position the symbols on the CRT screen. The blanking signal on a line 230 is fed to a cathode driver amplifier 232, whose output on a line 233 is fed to the CRT. The blanking signal turns the electron beam on and off.

In the HMD of the present invention, the day eyepiece 24 provides a 31 degree monocular FOV with approximately 36% see-through luminance transmission, and approximately 6% luminance transfer from the CRT (60% beamsplitter transmission, 60% combiner transmission). The night eyepiece provides for a 40 degree monocular FOV, and nearly 100% luminance transfer from the CRT with no see-through. Thus, the eyepieces are designed for very different viewing conditions: high luminance symbols superposed on the external scene, and low luminance, high resoultion imagery.

Each optical component arrangement 17,18 accomodates a CRT image source 14,15 having an active image diameter in the useful range of 16-25 mm (actual diameter is 19 mm). Also, each arrangement 17,18, including the eyepiece 24,25, has an effective focal length in the range of 15-55 mm (actual is 36 mm with the day eyepiece; 37 mm with the night eyepiece). Each eyepiece has a minimum 8 mm exit pupil, and an eye relief of 24 mm (eye relief being the distance from the eye to the nearest optical component). This eye relief allows for excellent observer peripheral vision and the wearing of eyeglasses and/or an oxygen mask.

Figure 10:
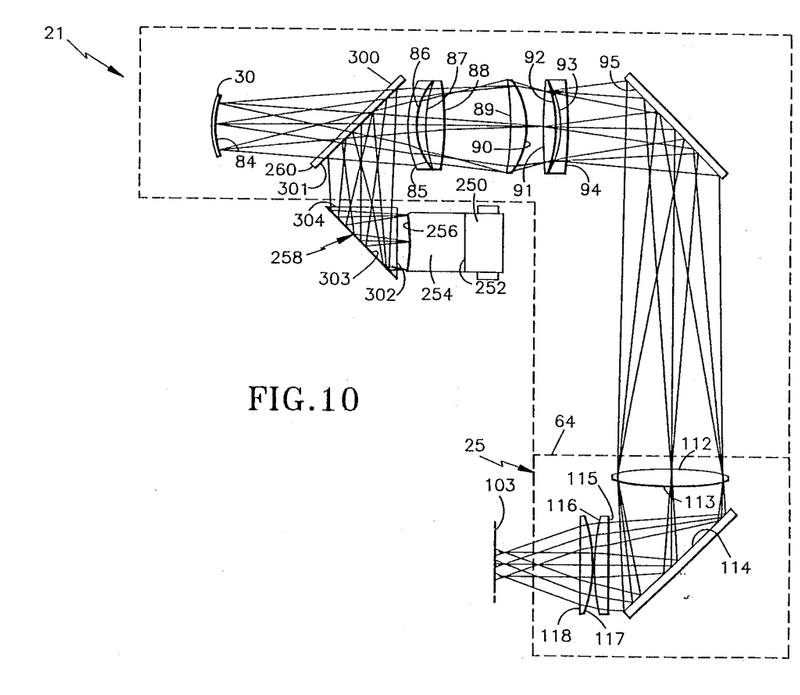
FIG. 10 is an optical ray trace of an alternative embodiment to the arrangement of FIG. 4.

FIG. 10 illustrates an alternative embodiment of the optical component arrangement illustrated in FIG. 5. Table III lists the corresponding prescription data. The alternative embodiment includes the relay optics of FIG. 5 and the night eyepiece of FIG. 6, with the addition of a known viewing objective lens 250 and refractive means 252–260 for coupling an image of the external scene into the observer's forward visual field.

As shown, the viewing objective lens 250 forms an image of an external scene on an input face 252 of a known fiber optic inverter 254. This inverter 254 provides an image at an output surface 256 which is rotated by 180 degrees. The curvature of the output image surface 256 of the fiber optic inverter is optically designed to present a flat field. A reflecting prism 258 and beamsplitter 260 are used to direct rays into the relay optics 21. In this configuration, the virtual image presented in the observer's forward visual field is a superposition of the CRT symbol data and the external scene.

The viewing objective lens 250 is selected to have the same FOV as the monocular virtual image presented into the observer's visual field (e.g., 40 degrees for use with the night eyepiece). In simulator use, for investigating partial overlap, the viewing objectives lenses (one for each optical component arrangement 17,18) are turned out to provide individual left and right eye images, and the eyepiece housings 27,28 are correspondingly rotated to present a partial overlap image.

Note in FIG. 10 and Table III that surfaces 300,301 are that of beamsplitter 260, while surfaces 302,303,304 are surfaces of prism 258.

TABLE III

| Surface No. | Radius (mm) | Curve Type | Thick/Dist (mm) | Mat'l |
|---|---|---|---|---|
| 84 | 30.620000 | CV | 46.400000 | AIR |
| 300 | — | — | 1.000000 | SIO2 |
| 301 | — | — | 15.150000 | AIR |
| 85 | 28.285000 | CX | 3.000000 | F4 |
| 256 | 30.619700 | CV | 4.000000 | AIR |
| 302 | — | — | 12.000000 | ACRYL |
| 303 | — | — | 12.000000 | ACRYL |
| 304 | — | — | 26.650000 | AIR |
| 301 | — | — | 15.150000 | AIR |
| 85 | 28.285000 | CX | 3.000000 | F4 |
| 86 | 20.309000 | CV | 2.731300 | AIR |
| 87 | 52.397000 | CX | 5.500000 | SIO2 |
| 88 | 81.200000 | CX | 22.462960 | AIR |
| 89 | 201.985000 | CV | 5.500000 | SIO2 |
| 90 | 24.617000 | CX | 5.342720 | AIR |
| 91 | 1253.000000 | CX | 4.500000 | SIO2 |
| 92 | 46.488000 | CX | 1.147060 | AIR |
| 93 | 30.500000 | CV | 3.000000 | F4 |
| 94 | 98.331000 | CX | 34.300000 | AIR |
| 95 | — | — | 112.929245 | AIR |
| 112 | 58.105000 | CX | 7.000000 | ACRYL |
| 113 | 89.283000 | CX | 25.070755 | AIR |
| 114 | — | — | 20.500000 | AIR |

TABLE III-continued

| Surface No. | Radius (mm) | Curve Type | Thick/ Dist (mm) | Mat'l |
| --- | --- | --- | --- | --- |
| 115 | — | — | 4.000000 | ACRYL |
| 116 | 83.478000 | CX | 0.500000 | AIR |
| 117 | 39.515000 | CX | 4.500000 | ACRYL |
| 118 | — | — | 25.000000 | AIR |
| 103 | — | — | — | — |

Figure 11:
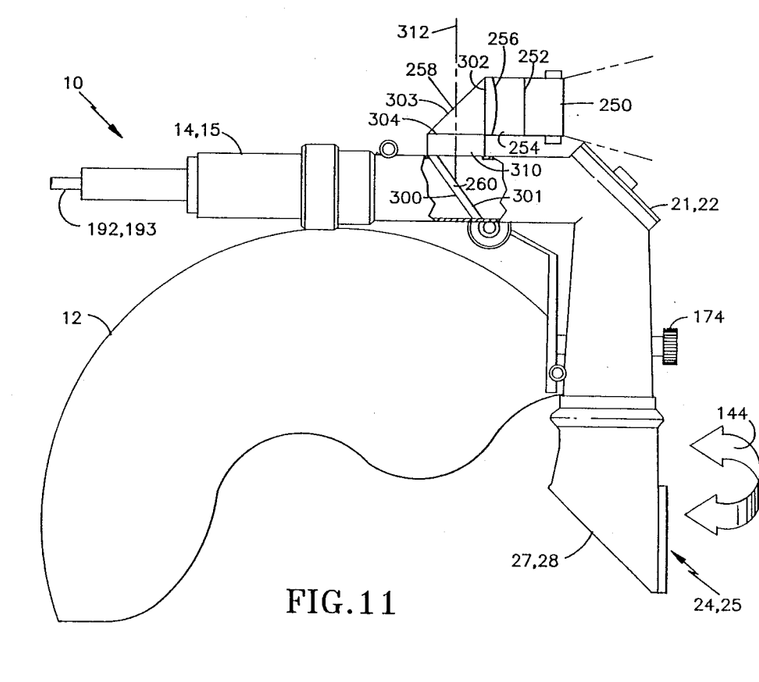
FIG. 11 is a second side view of the HMD simulator apparatus of FIG. 1, but including the alternative embodiment of FIG. 10.

Referring to FIG. 11, the viewing objective lens 250, inverter 254, and prism 258 are helmet mounted on a rotatable coupling 310 that allows for rotation of the devices 250,254,258 about a vertical axis 312. The viewing objective lens is disposed to view an external scene. Also illustrated is the beamsplitter 260 mounted internal to the relay optics housing 21,22. The devices 250,254,258 can be mounted in a suitable housing (not shown) that attaches to the rotatable coupling 310, or they can be secured together in a suitable manner. In this case, the CRTs are generating symbol data images.

Binocular imaging with partial overlap of the left and right visual fields places strict requirements on the viewing optics, since superposition of image elements in the overlap region is extremely critical if visual problems such as double vision or eyestrain are to be avoided. Thresholds for misalignment leading to visual problems as low as one milliradian in the visual field can exist. Also, optical disparities between the left and right channels due to magnification differences, curvature of field, and distortion must be controlled. For example, curvature of field is an optical aberration whereby the focus position varies over the FOV. Since in the overlap region each eye views the same image at a different location in the field (e.g., an image element at the center of the right visual field may be located at the edge of the left field), field curvature may result in image misalignment. Similarly, distortion may cause a straight line element image in the left and right sectors of the partial overlap region to bend away from each other, thereby causing blur or misalignment. Consequently, FIGS. 5,6,10 and Tables I–III set forth an optical design with aberration control compatible with partial overlap imaging.

The HMD of the present invention provides the researcher with an ability to test a wide variety of optical configurations, including continuously variable fields of view, see-through or no see through, full overlap, or no overlap, and binocular or monocular viewing, all over a wide range of interpupillary distances. Thus, it is an ideal tool for evaluating HMD technology in regard to human factors research and display format development.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Head mounted display apparatus providing a variable binocular field of view with variable partial overlap of the left and right monocular fields, said apparatus intended primarily for the investigation of visual display parameters in a flight simulator or other experimental flight environment, comprising:

helmet means, adapted to permit attachment of optical components, having an opening in proximity to the eyes of the observer;

image source means, being self luminous and adapted to be mounted to said helmet means, for providing images comprising symbols, text or scenic images generated by a computer or from an external sensor such as a TV camera;

optic means, adapted to be mounted to said helmet means, for presenting a virtual image of said image source means at a focus of from one meter to infinity in the observer's visual field, said optic means comprising left and right optics modules, each said module including a corresponding one of said image source means and comprising relay optic means and two separate interchangeable optical eyepiece means, each said relay optic means comprising an arrangement of optical components common for usage with each said eyepiece means; and coupling means for releasably engaging said eyepiece means to the corresponding one of said optics modules, said coupling means further comprising means for rotating said eyepiece about an axis of said corresponding optics module, whereby the display system optical axis projecting into the observer's visual field is caused to deviate from the observer's straight forward line of sight, thereby presenting to the observer' visual field a binocular image of variable angular extend comprising partially overlapped left and right images, said binocular image having a central portion comprising a portion of each of said left and right image source means images, said central image portion being presented in common to both eyes, said binocular image also having left and right peripheral image portions being presented respectively to the left and right eyes.

2. The apparatus of claim 1, wherein said relay optics means presents an intermediate real image of said image source means along the optical path of said relay optic means, said intermediate image having a magnification of 0.5 to 4.0 which when viewed with said eyepiece means presents said virtual image in the observer's forward visual field.

3. The apparatus of claim 2, wherein each of said optic modules is disposed on said helmet means in a vertical plane containing the straight forward line of sight, said eyepiece means being rotatable about an axis in said plane orthogonal to the line of sight thereby providing a horizontal field of view of variable angular subtense.

4. The apparatus of claim 3, wherein a first type of said eyepiece means is catadioptric, said catadioptric eyepiece comprising partially reflective, partially transmissive optical component means for superimposing a virtual image of said image source means in the observer's view of the external scene, said virtual image occupying a portion of the observer's visual field having a minimum subtense of 10 degrees at the observer's eye, said catadioptric eyepiece having an eye relief of at least 24 millimeters, whereby said catadioptric eyepiece is optimized for viewing the relatively high luminance of said image source means superposed on the observer's view of the external scene.

5. The apparatus of claim 4, wherein said catadioptric eyepiece means includes a partially transmissive, partially reflective plane beamsplitter disposed in front of the observer's eye, and a second partially transmissive, partially reflective curved combiner optical component disposed in front of said plane beamsplitter along the observer's line of sight.

6. The apparatus of claim 5, wherein a surface of said combiner nearest to the observer's eye is coated with a partially reflective, partially transmissive optical coating having reflectivity in the range of 20-60 percent for visible light in the wavelength range of 400-700 nanometers.

7. The apparatus of claim 6, wherein a surface of said plane beamsplitter farthest from the observer's eye is coated with a partially reflective, partially transmissive optical coating having reflectivity in the range of 20-60 percent for visible light in the wavelength range of 400-700 nanometers.

8. The apparatus of claim 7, wherein a secondary surface of each of said plane beamsplitter and said combiner is coated with an antireflective optical coating for visible light in the wavelength range of 400-700 nanometers, whereby said antireflective coating reduces spurious reflections of visible light in the wavelength range of 400-700 nanometers.

9. The apparatus of claim 5, wherein said combiner comprises a lightweight fused silica glass material.

10. The apparatus of claim 5, wherein said plane beamsplitter comprises a lightweight fused silica glass material.

11. The apparatus of claim 5, wherein said combiner comprises a polycarbonate or acrylic optical plastic material.

12. The apparatus of claim 5, wherein said plane beamsplitter comprises a polycarbonate or acrylic optical plastic material.

13. The apparatus of claim 4, wherein the effective focal length of said relay optic means optical components together with said catadioptric eyepiece optical components is in the range of 15-55 millimeters.

14. The apparatus of claim 4, wherein said image source means includes an output image surface, said relay optic means optical components including a plurality of lenses and a plane folding mirror, said catadioptric eyepiece optical components including at least one field lens, said refractive eyepiece optical components together with said output image surface and said relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Image Source | 84 | 40.000000 | CV | 62.600000 | AIR |
| Lens | 85 | 28.285000 | CX | 3.000000 | F4 |
| " | 86 | 20.309000 | CV | 2.731300 | AIR |
| " | 87 | 52.397000 | CX | 5.500000 | SIO2 |
| " | 88 | 81.200000 | CX | 22.462960 | AIR |
| " | 89 | 201.985000 | CV | 5.500000 | SIO2 |
| " | 90 | 24.617000 | CX | 5.342720 | AIR |
| " | 91 | 1253.000000 | CX | 4.500000 | SIO2 |
| " | 92 | 46.488000 | CX | 1.147060 | AIR |
| " | 93 | 30.500000 | CV | 3.000000 | F4 |
| " | 94 | 98.331000 | CX | 34.300000 | AIR |
| Mirror | 95 | — | — | 144.000000 | AIR |
| Beamsplitter | 100 | — | — | 33.947919 | AIR |
| Combiner | 101 | 137.360000 | CV | 35.087919 | AIR |
| Beamsplitter | 100 | — | — | 3.000000 | ACRYL |
| " | 102 | — | — | 51.420000 | AIR |
| " | 103 | — | — | — | — |

15. The apparatus of claim 3, wherein a second type of said eyepiece means is refractive, said refractive eyepiece having a totally reflective plane mirror disposed in front of the observer's eye and at least one lens disposed between the observer's eye and said plane mirror, said plane mirror and said lens disposed to present a virtual image of said image source means in the observer's visual field, said virtual image occupying a portion of the observer's visual field having a minimum subtense of 20 degrees at the observer's eye, said refractive eyepiece having an eye relief of at least 24 millimeters, whereby said refractive eyepiece is optimized for viewing low luminance images provided by said image source means.

16. The apparatus of claim 15, wherein the effective focal length of said relay optic means optical components together with said refractive eyepiece optical components is in the range of 15-55 millimeters.

17. The apparatus of claim 15, wherein said image source means includes an output image surface, said relay optic means optical components including a plurality of lenses and a plane folding mirror, said refractive eyepiece optical components including at least one eyepiece lens, said refractive eyepiece optical components together with said output image surface and said relay optic means optical components having the following optical prescription characteristics and inter-component spacing:

| Component Type | Surface No. | Radius (mm) | Curve Type | Thickness/Dist (mm) | Mat'l |
|---|---|---|---|---|---|
| Image Source | 84 | 40.000000 | CV | 61.863200 | AIR |
| Lens | 85 | 28.285000 | CX | 3.000000 | F4 |
| " | 86 | 20.309000 | CV | 1.792300 | AIR |
| " | 87 | 52.397000 | CX | 6.000000 | SIO2 |
| " | 88 | 81.200000 | CX | 21.905600 | AIR |
| " | 89 | 201.985000 | CV | 5.500000 | SIO2 |
| " | 90 | 24.617000 | CX | 5.209200 | AIR |
| " | 91 | 1253.000000 | CX | 4.500000 | SIO2 |
| " | 92 | 46.488000 | CX | 1.147060 | AIR |
| " | 93 | 30.500000 | CV | 3.000000 | F4 |
| " | 94 | 98.331000 | CX | 34.300000 | AIR |
| Mirror | 95 | — | — | 112.929245 | AIR |
| Lens | 112 | 58.105000 | CX | 7.000000 | ACRYL |
| " | 113 | 89.283000 | CX | 25.070755 | AIR |
| Mirror | 114 | — | — | 20.500000 | AIR |
| Lens | 115 | — | — | 4.000000 | ACRYL |
| " | 116 | 83.478000 | CX | 0.500000 | AIR |
| " | 116 | 83.47800 | CX | 0.500000 | AIR |
| " | 117 | 39.515000 | CX | 4.500000 | ACRYL |
| " | 118 | — | — | 25.000000 | AIR |
| " | 103 | — | — | — | — |

18. The apparatus of claim 1, wherein said image source means comprises a miniature cathode ray tube having an active image diameter in the range of 16-25 millimeters.

19. The apparatus of claim 1, wherein said relay optics means optical components are comprised of different optical materials, whereby said different optical materials control chromatic abberrations of visible light.

20. The apparatus of claim 19, wherein said different optical materials include fused silica glass and F4 glass.

21. The apparatus of claim 19, wherein said different optical materials include arcylic and polycarbonate.

22. Head mounted display apparatus providing a variable binocular field of view with variable partial overlap of the left and right monocular fields, said apparatus intended primarily for the investigation of visual display parameters in a flight simulator or other experimental flight environment, comprising:

helmet means, adapted to permit attachment of optical components, having an opening in proximity to the eyes of the observer;

image source means, being self luminous and adapted to be mounted to said helmet means, for providing images comprising symbols, text or graphic images generated by a computer or from an external sensor such as a TV camera;

optic means, adapted to be mounted to said helmet means, for presenting a virtual image of said image source means at a focus of from one meter to infinity in the observer's visual field, said optic means comprising left and right relay optics modules, each said module comprising coupling optic means, common relay optic means and optical eyepiece means;

viewing objective means, comprising left and right viewing optics modules each being adapted to be mounted to a corresponding one of said relay optics modules, for providing an image of a portion of the external scene disposed beyond said viewing objective means;

first coupling means, for releasably engaging said eyepiece means to a corresponding one of said relay optics modules, said coupling means comprising means for rotating said engaged eyepiece means about an axis of said relay optics module, whereby the display system optical axis projecting into the observer's visual field is caused to deviate from the observer's straight forward line of sight, thereby presenting to the observer a binocular image of variable angular extent comprising partially overlapped left and right images; and second coupling means, for releasably engaging each said viewing objective means to a corresponding one of said optic means, said coupling means comprising means for rotating said engaged viewing objective means about an axis parallel to said eyepiece means axis of rotation, whereby said viewing objective means rotation presents left and right images of the external scene in the observer's visual field, said left and right external scene images comprising both a common image portion in the view of both of said viewing objective means and separate left and right peripheral image portions being in the view respectively of said left and right viewing objective means, the observer further rotating said corresponding eyepiece means by a corresponding amount in response to said viewing objective means rotation, said eyepiece means rotation and said viewing objective means rotation varying the total field of view and correspondingly the degree of binocular overlap of said external scene images being presented to the observer's eyes.

23. The apparatus of claim 22, wherein said viewing objective means comprises:

objective lens means, for providing an image of a portion of an external scene disposed beyond said viewing objective lens means;

optical inverter means, having an output image surface, for rotating said external scene image by 180 degrees and providing said rotated image on said output image surface;

optical reflecting means, for directing said rotated image towards a corresponding one of said common relay optic means; and optical beamsplitter means, disposed in the optical path of said common relay optic means, for simultaneously reflecting the light rays indicative of said rotated image into the optical path of said common relay optic means and transmitting the light rays from said image source means along the optical path of said common relay optic means.

24. The apparatus of claim 23, wherein said optical reflecting means comprises a mirror.

25. The apparatus of claim 23, wherein said optical reflecting means comprises a prism.

26. The apparatus of claim 23, wherein said optical inverter means comprises a fiber optic inverter.

27. The apparatus of claim 23, wherein said common relay optics means presents an intermediate real image of said image source means along the optical path of said common relay optic means, said intermediate image having a magnification of 0.5 to 4.0 which when viewed with said eyepiece means presents said virtual image in the observer's forward visual field.

28. The apparatus of claim 27, wherein each said relay optics module is disposed on said helmet means in a vertical plane containing the straight forward line of sight, said eyepiece means being rotatable about an axis in said plane orthogonal to the line of sight thereby providing a horizontal field of view of variable angular subtense.

29. The apparatus of claim 28, wherein said eyepiece means is refractive, said refractive eyepiece having a totally reflective plane mirror disposed in front of the observer's eye and having at least one lens disposed between the observer's eye and said plane mirror, said plane mirror and said lens disposed to present a virtual image of said intermediate real image in the observer's visual field, said virtual image occupying a portion of the observer's visual field having a minimum subtense of 20 degrees at the observer's eye, said refractive eyepiece having an eye relief of at least 24 millimeters, whereby said refractive eyepiece is optimized for viewing the relatively low luminance of said external scene image superposed with said image source means image.

30. The apparatus of claim 29, wherein the effective focal length of said relay optic means optical components together with said refractive eyepiece optical components is in the range of 15-55 millimeters.

31. The apparatus of claim 22, wherein said image source means comprises a miniature cathode ray tube having an active image diameter in the range of 16-25 millimeters.

32. The apparatus of claim 22, wherein said relay optics means optical components are comprised of different optical materials, whereby said different optical materials control chromatic abberrations of visible light.

33. The apparatus of claim 32, wherein said different optical materials include fused silica glass and F4 glass.

34. The apparatus of claim 32, wherein said different optical materials include acrylic and polycarbonate.

35. The apparatus of claim 34, wherein said image source means includes an output image surface, said common relay optic means optical components including a plurality of lenses and a plane folding mirror, said refractive eyepiece optical components including at least one eyepiece lens, said refractive eyepiece optical components together with said output image surface, said viewing objective means and said common relay optic means optical components having the following optical prescription characteristics and inter-component spacing:

| Component Type | Surface No. | Radius (mm) | Curve Type | Thick/Dist (mm) | Mat'l |
|---|---|---|---|---|---|
| Image Surface | 256 | 30.619700 | CV | 4.000000 | AIR |
| Prism | 302 | — | — | 12.000000 | ACRYL |
| " | 303 | — | — | 12.000000 | ACRYL |
| " | 304 | — | — | 26.650000 | AIR |
| Beamsplitter | 301 | — | — | 15.150000 | AIR |
| Lens | 85 | 28.285000 | CX | 3.000000 | F4 |
| Image Source | 84 | 40.000000 | CV | 61.863200 | AIR |
| Beamsplitter | 300 | — | — | 1.000000 | SIO2 |
| " | 301 | — | — | 15.150000 | AIR |
| Lens | 85 | 28.285000 | CX | 3.000000 | F4 |
| " | 86 | 20.309000 | CV | 1.792300 | AIR |
| " | 87 | 52.397000 | CX | 6.000000 | SIO2 |
| " | 88 | 81.200000 | CX | 21.905600 | AIR |
| " | 89 | 201.985000 | CV | 5.500000 | SIO2 |
| " | 90 | 24.617000 | CX | 5.209200 | AIR |
| " | 91 | 1253.000000 | CX | 4.500000 | SIO2 |
| " | 92 | 46.488000 | CX | 1.147060 | AIR |
| " | 93 | 30.500000 | CV | 3.000000 | F4 |
| " | 94 | 98.331000 | CX | 34.300000 | AIR |
| Mirror | 95 | — | — | 112.929245 | AIR |
| Lens | 112 | 58.105000 | CX | 7.000000 | ACRYL |
| " | 113 | 89.283000 | CX | 25.070755 | AIR |
| Mirror | 114 | — | — | 20.500000 | AIR |
| Lens | 115 | — | — | 4.000000 | ACRYL |
| " | 116 | 83.478000 | CX | 0.500000 | AIR |
| " | 117 | 39.515000 | CX | 4.500000 | ACRYL |
| " | 118 | — | — | 25.000000 | AIR |
| " | 103 | — | — | — | — |

* * * * *

UNITED STATES PATENT AND TRADEMARK OFFICE
CERTIFICATE OF CORRECTION

PATENT NO. : 4,968,123

DATED : November 6, 1990

INVENTOR(S) : Joseph T. Fournier, Jr. et al

It is certified that error appears in the above-identified patent and that said Letters Patent is hereby corrected as shown below:

ON THE TITLE PAGE, IN OTHER PUBLICATIONS

Line 2, "Helmut" should be --Helmet--

Line 7, "Helmut" should be --Helmet--

IN THE ABSTRACT

Line 1, "Helmut" should be --Helmet--

Line 10, "wheeby" should be --whereby--

IN THE CLAIMS

Column 10, Claim 1, line 29, "observer" should be --observer's--.

Column 11, Claim 14, Line 45, "refractive" should be --catadioptric--

Column 12, Claim 17, Line 50, insert --AIR-- after "34.300000"

Column 12, Claim 17, Line 51, delete "AIR"

Column 12, Claim 17, Line 57, delete "  " 116 83-47800 CX 0.500000 AIR"

Signed and Sealed this

Twenty-seventh Day of April, 1993

*Attest:*

MICHAEL K. KIRK

*Attesting Officer*      *Acting Commissioner of Patents and Trademarks*